(12) United States Patent
Kho et al.

(10) Patent No.: US 8,626,555 B2
(45) Date of Patent: Jan. 7, 2014

(54) CREATING SCHEDULED EVENTS IN AN ELECTRONIC CALENDAR

(75) Inventors: Nancy E. Kho, Belmont, MA (US); Bill D. Le, Revere, MA (US); Fang Lu, Billerica, MA (US); Alaa A. Mahmoud, Dracut, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/315,661

(22) Filed: Dec. 9, 2011

(65) Prior Publication Data
US 2013/0151302 A1    Jun. 13, 2013

(51) Int. Cl.
*G06Q 10/00* (2012.01)
(52) U.S. Cl.
USPC ..................................... 705/7.19; 705/7.18
(58) Field of Classification Search
USPC ............................................. 705/7.18, 7.19
See application file for complete search history.

(56) References Cited

U.S. PATENT DOCUMENTS

| | | | |
|---|---|---|---|
| 5,500,938 A * | 3/1996 | Cahill et al. ................... | 715/856 |
| 5,732,399 A * | 3/1998 | Katiyar et al. ................. | 705/7.18 |
| 6,434,571 B1 | 8/2002 | Nolte | |
| 8,086,478 B2 * | 12/2011 | Chen et al. .................... | 705/7.19 |
| 2005/0222971 A1 * | 10/2005 | Cary ................................. | 707/1 |
| 2007/0239509 A1 * | 10/2007 | Kaminsky et al. ................ | 705/9 |
| 2008/0288323 A1 * | 11/2008 | Demsky et al. .................... | 705/9 |
| 2009/0003138 A1 * | 1/2009 | Donnelli et al. ................. | 368/28 |
| 2012/0239451 A1 * | 9/2012 | Caligor ......................... | 705/7.21 |

OTHER PUBLICATIONS

User's Guide for Microsoft Project for Windows. 95 and Windows 3.1 1995.*

* cited by examiner

*Primary Examiner* — Johnna Loftis
(74) *Attorney, Agent, or Firm* — A. Bruce Clay

(57) ABSTRACT

A relationship is established between scheduled events in an electronic calendaring application. A first event is scheduled on the electronic calendaring application and at least a second event is scheduled at a user designated time interval relative to the first event. The at least a second event is automatically changed when the user initiates a change to the first event. The user designated time interval is automatically maintained between the first event and the at least a second event.

6 Claims, 7 Drawing Sheets

| | ◁ June 21 – June 27, 20XX ▷ | | | | |
|---|---|---|---|---|---|
| | 21 Mon Jun 20XX | 22 Tue Jun 20XX | 23 Wed Jun 20XX | 24 Thu Jun 20XX | 25 |
| 7:00 am | | | | | |
| 8:00 | | | | PROJECT MEETING | |
| 9:00 | | | 202⤳ ALL HANDS MEETING SESSION 1 | | |
| 10:00 | | | | ⌐402 | |
| 11:00 | | | 400⤳ ALL HANDS MEETING SESSION 2 | | |
| 12:00 | | | | | |

| | | | | |
|---|---|---|---|---|
| 12:00 pm | ○ LUNCH | ○ LUNCH | ○ LUNCH | ○ LUNCH |
| 1:00 | | | | |
| 2:00 | | 202 → | RESCHEDULE ALL HANDS MEETING SESSION 1 | |
| 3:00 | | | | ← 402 |
| 4:00 | | 400 → | RESCHEDULE ALL HANDS MEETING SESSION 2 | |
| | | | | |

CREATING SCHEDULED EVENTS IN AN ELECTRONIC CALENDAR

BACKGROUND

The use of electronic calendaring systems has helped ease the burden of maintaining personal, as well as group, activities, including keeping track of daily schedules and meetings. Electronic calendaring systems may also provide access to lists of facilities available for holding meetings, such as, rooms, projectors, computer equipment, etc.

On occasion, meetings may be related or tied to other meetings, in some fashion. For example a worker may be preparing for a status meeting with his/her manager. Thus, there may be pre- and post-status meetings, for example, to obtain information for the meeting and to disseminate information after the meeting. Sometimes meetings with too many people or with too much information to cover need to be split into multiple meetings.

In such situations, multiple meetings (possibly before as well as after) may need to be rescheduled if the meeting they depend upon is rescheduled. Currently, the procedure for rescheduling meetings is to manually reschedule each of the meetings.

BRIEF SUMMARY

According to one embodiment of the present invention, a method of creating a relationship between scheduled events in an electronic calendaring application is provided. A first event is scheduled on the electronic calendaring application. At least a second event is scheduled at a user designated time interval relative to the first event. The at least a second event is automatically changed when the user initiates a change to the first event, wherein a user designated time interval is automatically maintained between the first event and the at least a second event.

According to one embodiment of the present invention, a system for creating a relationship between scheduled events in an electronic calendaring application is provided. The system comprises a processor and memory connected to the processor. Instructions are provided for scheduling a first event on the electronic calendaring application. Instructions are provided for scheduling at least a second event based upon a user designated time interval relative to the first event. The at least a second event is automatically changed when the user initiates a change to the first event, wherein a user designated time interval is automatically maintained between the first event and the at least a second event.

According to one embodiment of the present invention, a computer program product for creating a relationship between scheduled events in an electronic calendaring application is provided. The computer program product comprises a computer readable storage medium having computer readable program code embodied therewith. The computer readable program code is configured to schedule a first event on the electronic calendaring application. The computer readable program code is configured to schedule at least a second event based upon a user designated time interval relative to the first event. The at least a second event is automatically changed when the user initiates a change to the first event, wherein the user designated time interval is automatically maintained between the first event and the at least a second event.

BRIEF DESCRIPTION OF THE SEVERAL VIEWS OF THE DRAWINGS

FIG. 5 illustrates a display of changes to a following meeting scheduled in accordance with one embodiment of the present invention;

FIG. 6 illustrates a display of additional related meetings scheduled in accordance with one embodiment of the present invention;

DETAILED DESCRIPTION

Figure 1:
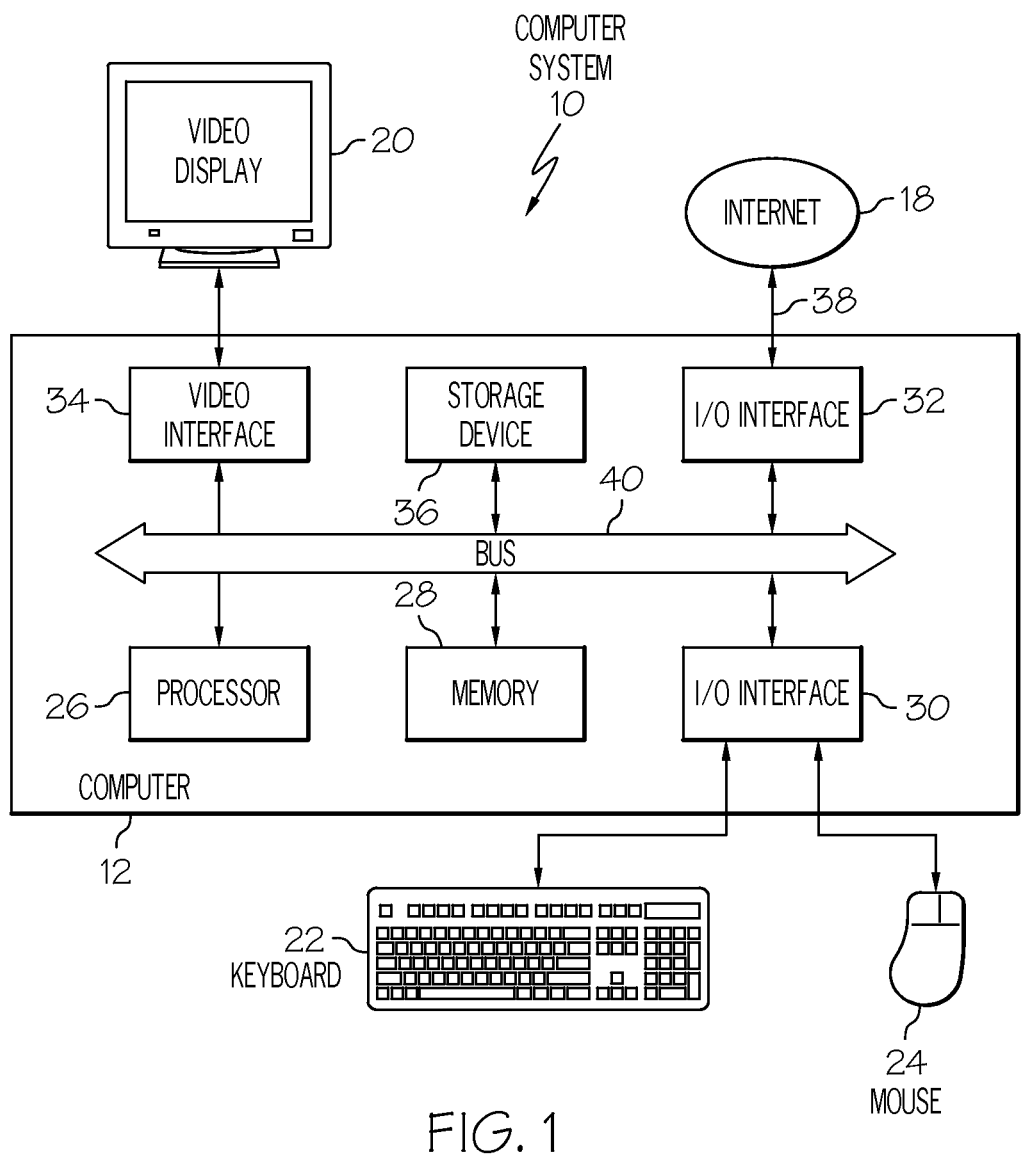
FIG. 1 is an illustration of a computer system upon which one embodiment of the present invention may be implemented.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable media (memory or device) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 is one example of a computer system 10 suitable for executing computer software for creating follow me meetings in an electronic calendar. Other processing devices which are suitable for executing the software can be a wireless telephone, personal assistant device (PDA), portable computer, smart remote control device, or any other processing devices that can execute such software.

The computer system 10 is of a type that executes under a suitable operating system installed on the computer system 10. The components of the computer system 10 include a computer 12, a keyboard 22, mouse 24, and a video display 20. The computer 12 includes a processor 26, a memory 28, input/output (I/O) interfaces 30 and 32, a video interface 34, and a storage device 36.

The processor 26 is a central processing unit (CPU) that executes the operating system and the computer software executing under the operating system. The memory 28 includes random access memory (RAM) and read-only memory (ROM), and is used under direction of the processor 26.

The video interface 34 is connected to a video display 20 and provides video signals for display thereon. User input to operate the computer 12 is provided from the keyboard 22 and mouse 24. The storage device 36 can include a disk drive or any other suitable storage medium, as discussed above. Each of the components of the computer 12 is connected to an internal bus 40 that includes data, address, and control buses, to allow components of the computer 12 to communicate with each other via the bus 40. The computer system 10 can be connected to one or more other similar computers via an input/output (I/O) interface 32 using a communication channel 38 to a network, represented as the Internet 18. One or more servers 19 may be connected to the computer 12 via a network, such as, the Internet 18. The servers 19 may comprise the same physical arrangement as the computer 12 and may be co-located with or a part of the computer 12.

The computer software may be recorded on a computer readable storage medium, in which case, the computer software program is accessed by the computer system 10 from the storage device 36. Alternatively, the computer software can be accessed directly from the Internet 18 by the computer 12. In either case, a user can interact with the computer system 10 using the keyboard 22 and mouse 24 to operate the programmed computer software executing on the computer 12.

As used herein, a "followed meeting" is defined to be the meeting upon which others depend. "Following meeting(s)" are defined as meetings dependent upon a followed meeting. Following meetings can be scheduled to occur before or after a followed meeting. Thus, the use of following to describe a meeting is not limited to being after another meeting but rather in the sense of being dependent upon another meeting. "Related meetings" is used to designate any group of meetings that have a followed meeting and at least one following meeting.

One embodiment of the present invention provides a way to create following meetings, even if not by the owner of the followed meeting. The following meetings can take place before or after the followed meeting by a designated period of time, for example, one hour after or at a certain time specified, for example, 2:00 PM the day after. Any time the followed meeting is rescheduled, all the following meetings will also be automatically rescheduled.

The related meetings can be viewed in a tabular calendar view with lines connecting the meetings, or in a tree view that places the followed meeting in the center with the before following meetings arranged above (in order of occurrence) and the after following meetings arranged below (in order of occurrence). It is also possible to designate one or more of the following meetings as a followed meeting in order to create other following meetings, therefrom. Thus, creation of cascading meetings is provided. Meetings may be manually rescheduled by dragging and dropping a meeting over a "separator line" to change a following meeting from a before following meeting to an after following meeting and vice versa, which can automatically reschedule the following meeting in the first available time slot in the region to which it is dropped.

One embodiment of the present invention will now be discussed with reference to FIGS. 2-5 and the following example. An "All Hands" meeting/event has been scheduled on an electronic calendar 200 by a Lab Director for all employees reporting to him/her as All Hands Meeting Session 1 designated by reference numeral 202 at 9:00 AM on Jun. 23, 20XX.

Since it is not always possible to actually have all hands attend one meeting at one scheduled time, the Lab Director decides to schedule a repeat of the meeting 202 two hours after the start of the meeting 202. The Lab Director selects, by clicking on, the meeting 202 and a drop down menu 204 appears.

Upon selection of "Follow . . . " 206, the Lab Director is presented with a dialog 300, as shown in FIG. 3. Using the dialog 300, options can be selected as to how the meeting 202 is to be followed. For example, the new (following) meeting can be selected to start, by selecting "Starts" 302, a certain number of "Days" 304 and/or "Hours" (Hrs.) 306 "Before" 308 or "After" 310 the selected (followed) meeting 202. Alternatively, the new (following) meeting can end, by selecting "Ends" 312, a certain number of "Days" 314 and/or "Hours" (Hrs.) 316 "Before" 318 or "After" 320 the selected (followed) meeting 202. This allows great flexibility in the creation of related meetings, as they can happen before, after, or even concurrently (by picking starts before with 0 days and 0 hrs). The following meeting is to start 2 hours after the start of the Followed Meeting 202 (FIG. 2), and, therefore, the Lab Director selects Starts 302, enters 2 into Hrs. 306 and selects After 310.

Although not shown, it is possible to have the scheduling application place the two meetings in nearby meeting rooms (or the same), to ensure the rooms have the right facilities, capacity, etc., by adding more choices to the dialog 300. In addition, all invitees to the followed meeting will be notified of the following meeting, unless changed by the Lab Director. After entering the desired choices, "OK" 322 (or "Cancel" 324, if desired) is selected.

If OK 322 is selected, a second (following) meeting "All Hands Meeting Session 2 (After)" designated by reference numeral 400 (FIG. 4) will be scheduled to start two hours after the start of Followed Meeting 202. The relationship between the Followed Meeting 202 and the following meeting 400 is indicated by a connecting line 402. If the chair (Lab Director) of the Followed Meeting 200 reschedules, the present invention will automatically reschedule the following meeting 400 (and other related meetings, if any) using the same parameters selected as shown in FIG. 3.

Referring to FIG. 5, the results of changing the Followed Meeting 202 from starting at 9:00 AM to starting at 2:00 PM, on the same day, are shown. The present invention will automatically reschedule the following meeting 400 to start at 4:00 PM in order to start 2 hours after the start of the Followed Meeting 202.

Figure 6:
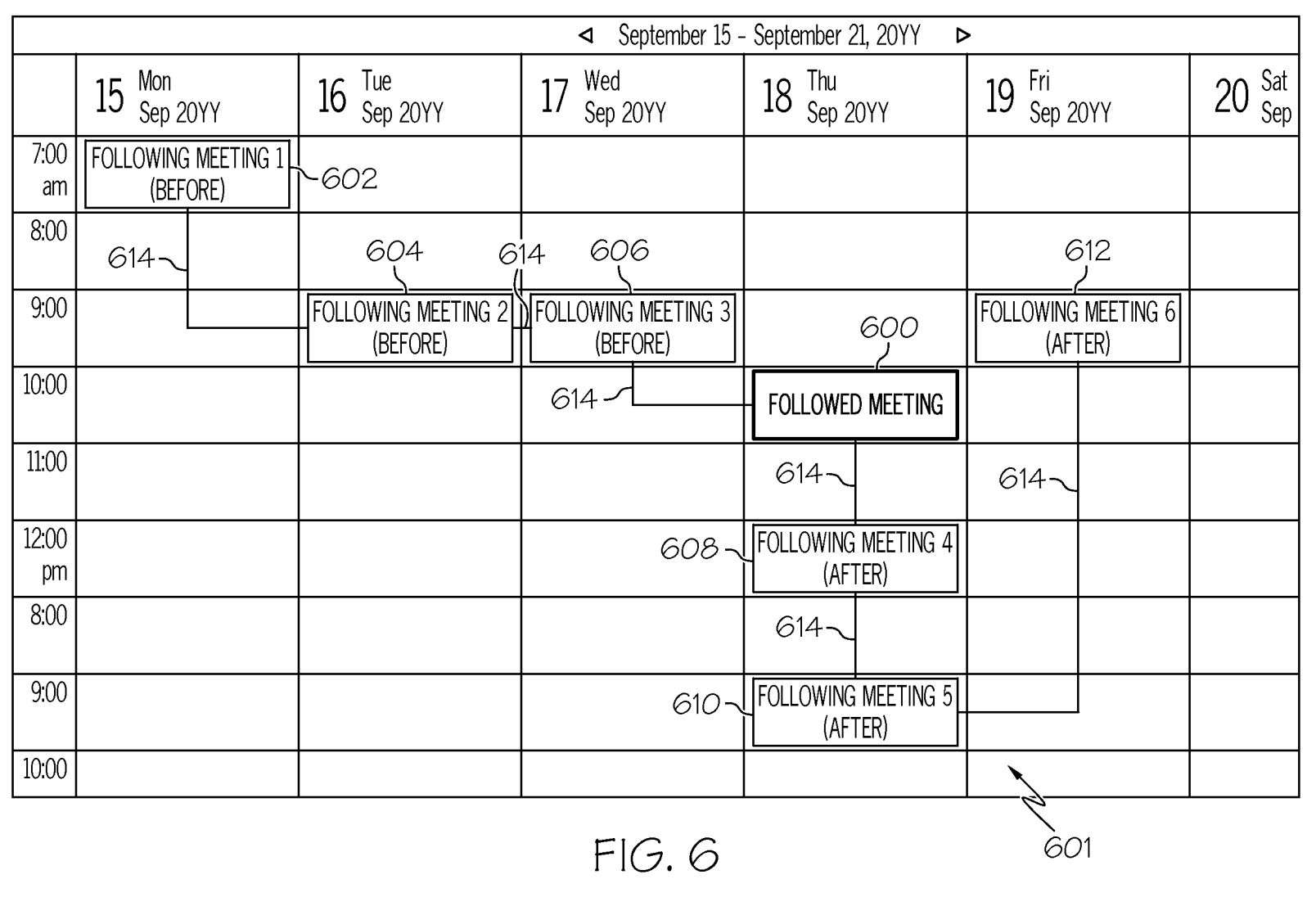

Referring now to FIG. 6, additional related meetings are illustrated. Six following meetings are scheduled on a calendar 601 around a Followed Meeting 600, which is highlighted, such as by making it bold, hashed, a different font, or a different color. After the Followed Meeting 600 is scheduled, a user, who may be other than the chair of meeting 600, can schedule following meetings before or after. For example, a first non-chair user wants to schedule a meeting before the Followed Meeting 600.

Figure 2:
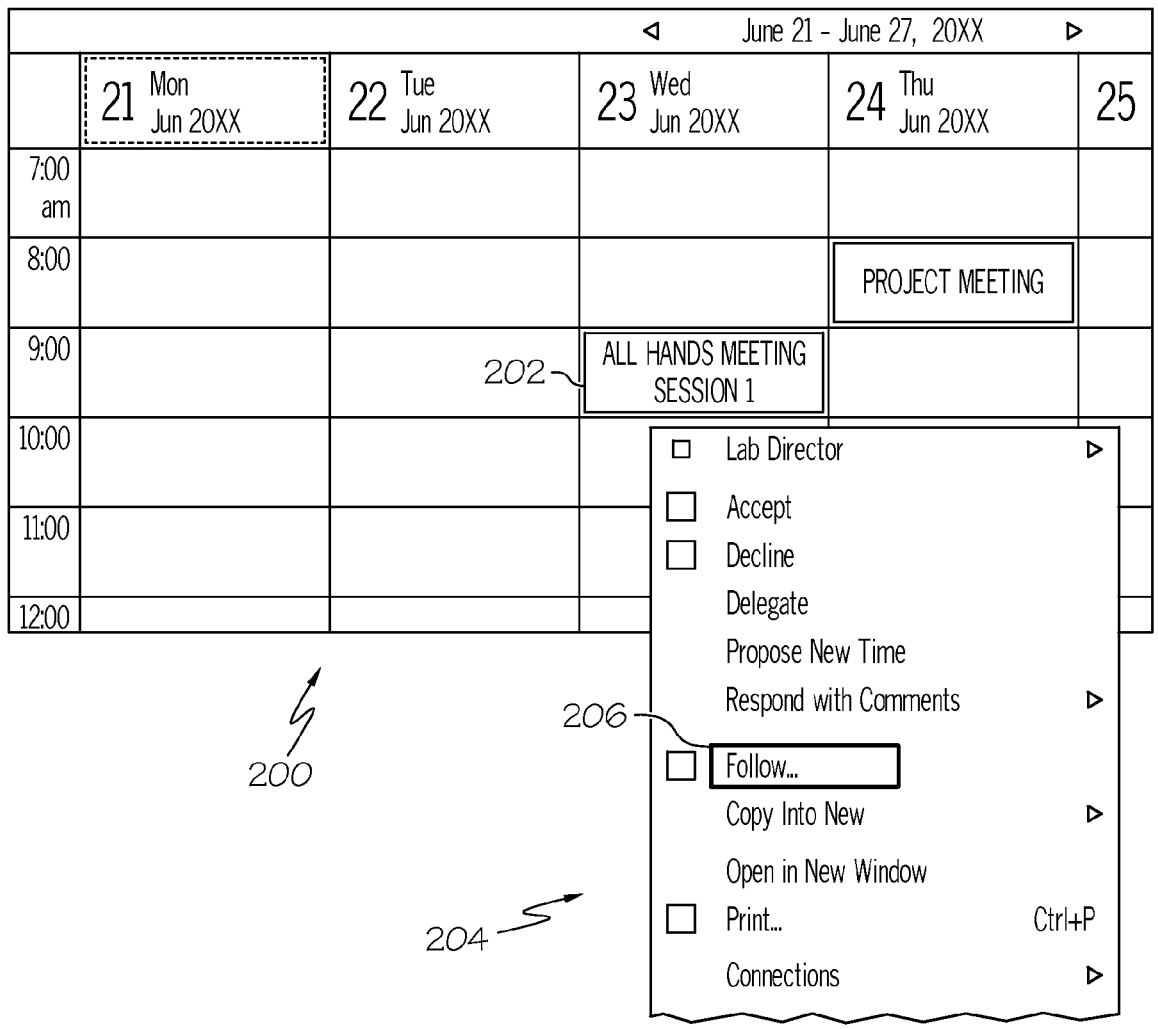
FIG. 2 illustrates the initial scheduling of a following meeting in accordance with one embodiment of the present invention.
Figures 3, 4:
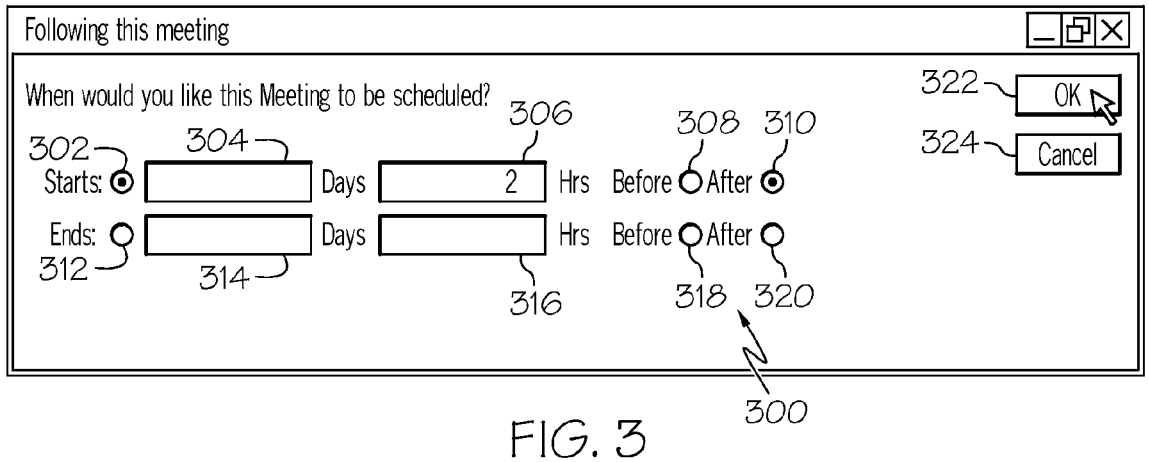
FIG. 3 illustrates a dialog of instructions for the scheduling of a following meeting in accordance with one embodiment of the present invention.
FIG. 4 illustrates a display of a following meeting scheduled in accordance with one embodiment of the present invention.

The first non-chair user clicks on the Followed Meeting 600 and a drop down menu, such as at 204 in FIG. 2, appears. The first non-chair user then selects "Follow . . . " 206 (FIG. 2), and the dialog 300 (FIG. 3) appears. The first non-chair user wants to schedule a following meeting to start three days and three hours before the start of the Followed Meeting 600. Thus, the first non-chair user will select Starts 302, enter "3" into Days 304, and "3" into Hours 306, and selects Before 308 (all references to FIG. 3). Thus, a "Following Meeting 1 (Before)" 602 is scheduled for 7:00 AM three days before the Followed Meeting 600.

In addition, the first non-chair user wants to schedule another following meeting at 9:00 AM two days before the Followed Meeting 600. The first non-chair user follows the same procedures as for the "Following Meeting 1 (Before)" 602 making the appropriate settings in the dialog 300 (FIG. 3) and a second meeting, "Following Meeting 2 (Before)" 604, is scheduled and shown on the calendar 601.

Additionally, a second non-chair user wants to add two meetings, one before and one after the Followed Meeting 600. The same procedure above is followed and a Following Meeting 3 (Before) 606 and a Following Meeting 4 (After) 608 are scheduled, according to the desired times selected by the second non-chair user.

Then, a third non-chair user wants to add two meetings after the Followed Meeting 600. As a result, a "Following Meeting 5 (After)" 610 and a "Following Meeting 6 (After)"

612 are scheduled, according to the times selected by the third non-chair user. All of the following meetings' (Following Meeting 1 (Before) 602, Following Meeting 2 (Before) 604, Following Meeting 3 (Before) 606, Following Meeting 4 (After) 608, Following Meeting 5 (After) 610, and Following Meeting 6 (After) 612) relationships with the Followed Meeting 600 are shown by connecting lines 614. Any change to the Followed Meeting 600 will automatically result in appropriate changes to all of the following meetings.

Figure 7:
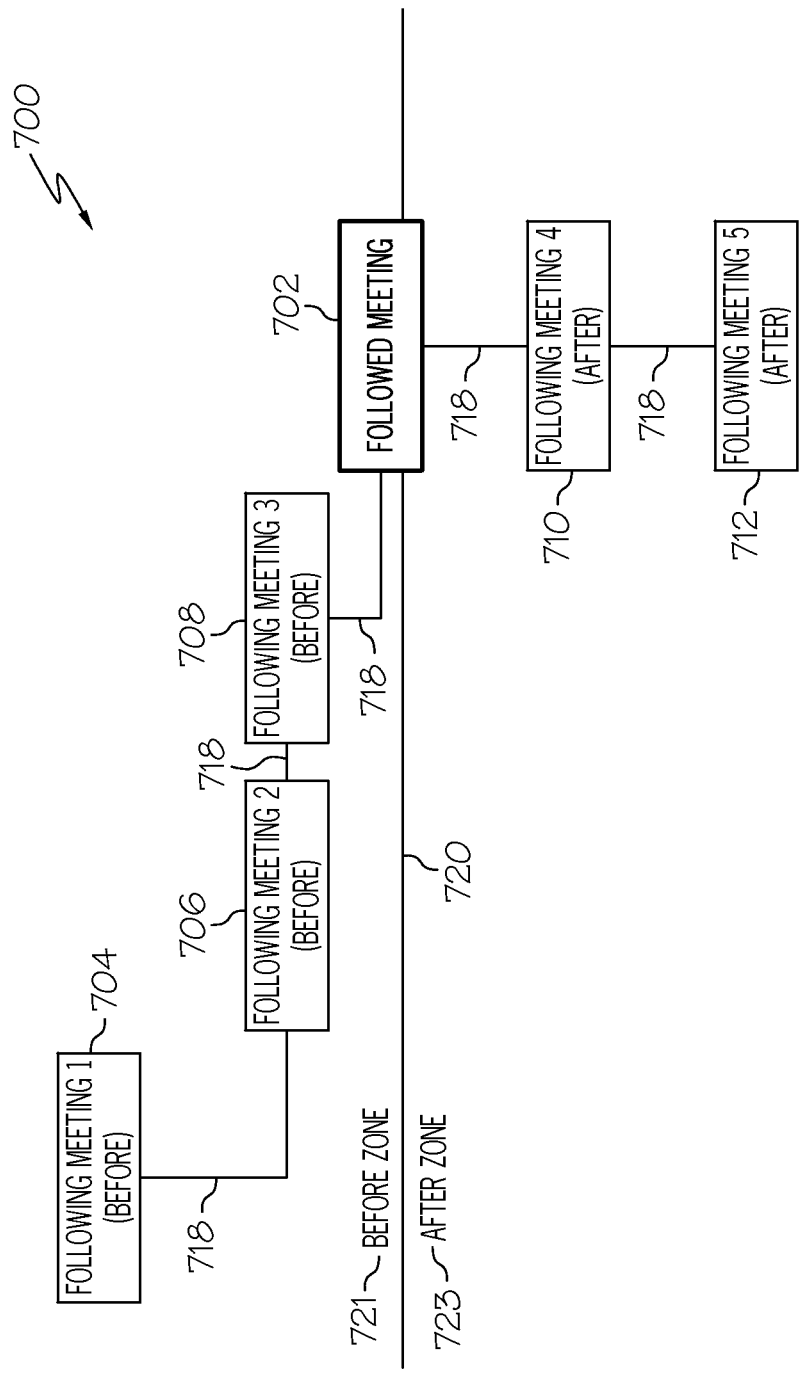
FIG. 7 illustrates a tree display of related meetings scheduled in accordance with one embodiment of the present invention.

As shown in FIG. 7, the present invention can also be used to produce a tree view 700 to show any related meetings. A Followed Meeting 702 (shown in bold or with any other distinguishing characteristic) is positioned with any following meetings drawn on either side and/or above or below. In the tree view, selection of a followed meeting, for example, the Followed Meeting 702, produces an imaginary horizontal line 720 which shows any meetings before the Followed Meeting 702 positioned above the line 720 in a "Before Zone 721." Similarly, any meetings after the Followed Meeting 702 are positioned below the line 720 in an "After Zone 723." Therefore, the Meeting 704, Meeting 706, and Meeting 708 are all before the Followed Meeting 702, as they are shown above the line 720. Similarly, the Meeting 710 and the Meeting 712 are both after the Followed Meeting 702, as they are shown below the line 720.

The meetings 702, 704, 706, 708, 710, and 712 in FIG. 7, do not have the clutter of a background calendar nor any unrelated meetings to overshadow the relationships, therebetween. For the purpose of illustration, the meetings 704, 706, 708, 710, and 712 are all related through the Followed Meeting 702, and, therefore, all are connected by a line 718. Thus, it is possible to more easily view the relationship between the following meetings and the followed meeting without any background clutter. Although not shown, it is to be understood that each meeting in FIG. 7 could have its date and time displayed with the title to the meeting. For example, the Meeting 704 could appear as:

Following Meeting 1 (Before)
7:00 AM EST Sep. 15, 20XX.

Figure 8:
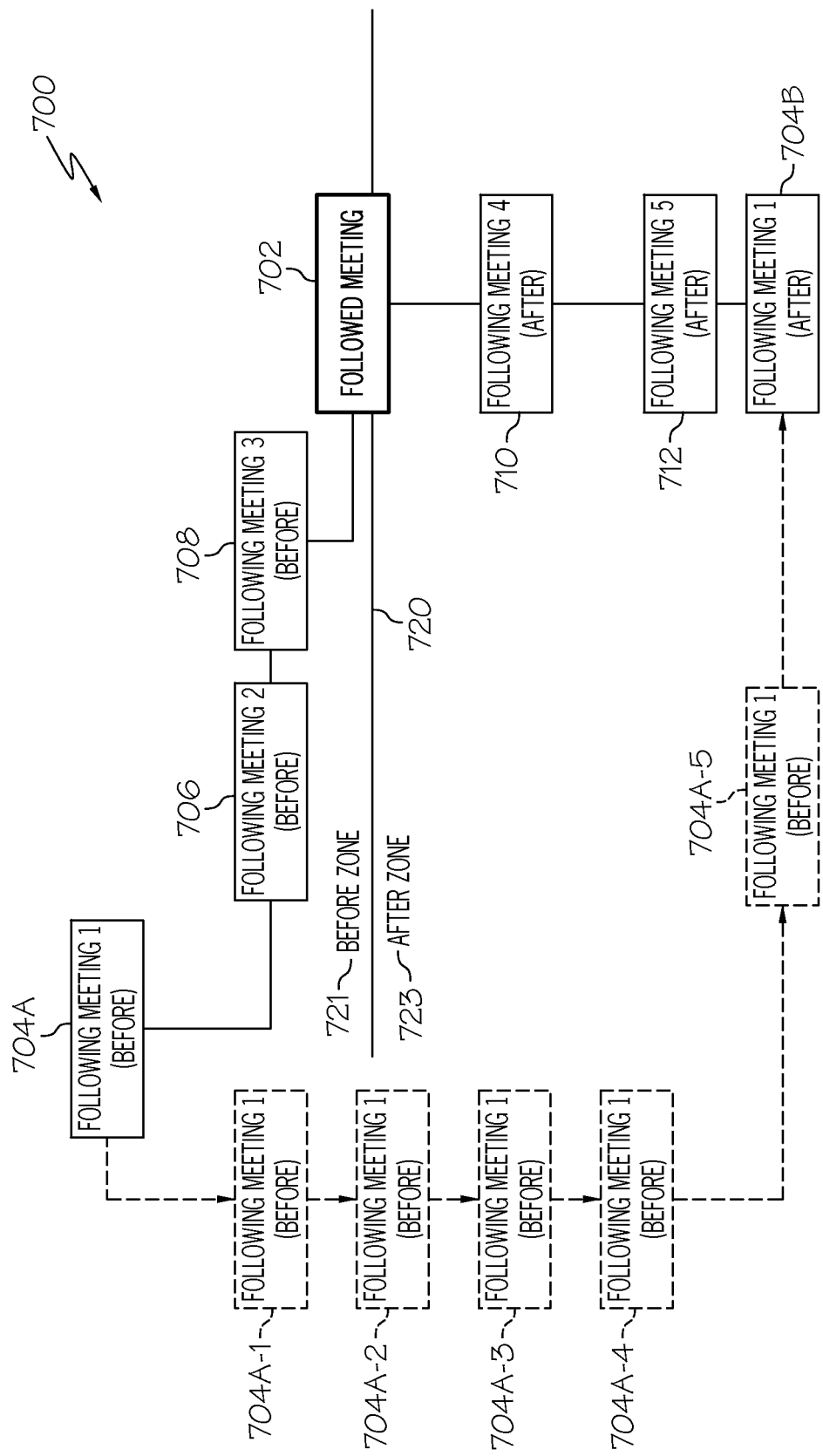
FIG. 8 illustrates a drag-and-drop feature of a tree display in accordance with one embodiment of the present invention.

Referring to FIG. 8 (the same tree 700 as in FIG. 7), an additional graphical interface feature in accordance with one embodiment of the present invention is illustrated. By selecting a meeting already scheduled, it is possible to drag-and-drop the meeting anywhere on the tree view (although not shown, it is to be understood that it is also possible to make a drag-and-drop schedule change in a calendar view). For example, the Following Meeting 1 (Before) 704A needs to be rescheduled to after the Followed Meeting 702. The user selects the Meeting 704A and "drags" it (as shown by the dashed sequential views of Following Meeting 1 (Before) 704A-1, 704A-2, 704A-3, 704A-4, and 704A-5) to any position below the imaginary horizontal line 720, where it is dropped. Upon release of the Meeting 704A, an alert message (not shown) would query the user if that new position and time is want the user really wants. The meeting's description would change to: Following Meeting 1 (After), as indicated by reference numeral 704B.

Dragging the Meeting 704A below the line 720 from the Before Zone 721 to the After Zone 723, reschedules the meeting to any available slot after the Followed Meeting 702. The properties of the Meeting 704A are adjusted to "After" instead of "Before" while trying to maintain the same gap (time difference between the following meeting and the followed meeting). Obviously, the time difference would become after rather than before, for example, instead of 4 hours before, the meeting would be 4 hours after. Additionally, conflict checking may be added in order to prevent the moved meeting from being placed into an already booked slot. A warning message, for example, as a pop-up message, would allow the user to avoid double booking the slot, look for the first available slot, or cancel the drop.

Automatic rescheduling, of a meeting that is dependent upon another meeting, is one advantage of the present invention. The graphical display of any relationship between meetings is another advantage of the present invention. A graphical display of the following meetings around the followed meeting to show before meetings and after meetings is also an advantage of the present invention.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of creating a relationship between scheduled meeting events in an electronic calendaring application, comprising:
displaying a plurality of days on the electronic calendaring application;
scheduling a first meeting event on a first day on the electronic calendaring application;
scheduling at least a second meeting event, related to said first meeting event, at a user designated interval from said first meeting event, said at least a second meeting event being on a second day different from said first day;
graphically interconnecting, with a processor, said first meeting event to said at least a second meeting event by a relationship line;
changing said at least a second meeting event upon a user change to said first meeting event, wherein said user designated time interval and said graphical interconnection by said relationship line are maintained, by said processor, between said first meeting event and said at least a second meeting event;
producing a graphically interconnected tree view from the electronic calendaring application with said first meeting event as a tree base and said at least a second meeting event as at least a first branch graphically interconnected by said relationship line to said tree base, wherein said graphically interconnected tree view comprises a before zone and an after zone separated by a horizontal line in order to visually cue a user as to whether said at least a second meeting event is before or after said first meeting event;
dragging and dropping said at least a second meeting event from said before zone above said horizontal line to said after zone below said horizontal line when changing said at least a second meeting event from before said first meeting event to after said first meeting event while maintaining said graphical interconnection by said relationship line; and dragging and dropping said at least a second meeting event from said after zone below said horizontal line to said before zone above said horizontal line when changing said at least a second meeting event from after said first meeting event to before said first meeting event while maintaining said graphical interconnection by said relationship line.

2. The method of claim 1, further comprising automatically notifying all invitees of said at least a second meeting event upon said changing said at least a second meeting event upon a user change to said first meeting event.

3. A system for creating a relationship between events in an electronic calendaring application, comprising:

a processor; and memory connected to the processor, wherein the memory is encoded with instructions and wherein the instructions when executed comprise:

instructions for displaying a plurality of days on the electronic calendaring application;

instructions for scheduling a first meeting event on a first day on the electronic calendaring application;

instructions for scheduling at least a second meeting event, related to said first meeting event, at a user designated interval from said first meeting event, said at least a second meeting event being on a second day different from said first day;

instructions for graphically interconnecting said first meeting event to said at least a second meeting event by a relationship line;

instructions for changing said at least a second meeting event upon a user change to said first meeting event, wherein said user designated time interval and said graphical interconnection by said relationship line are maintained between said first meeting event and said at least a second meeting event;

instructions for producing a graphically interconnected tree view from the electronic calendaring application with said first meeting event as a tree base and said at least a second meeting event as at least a first branch graphically interconnected by said relationship line to said tree base, wherein said graphically interconnected tree view comprises a before zone and an after zone separated by a horizontal line in order to visually cue a user as to whether said at least a second meeting event is before or after said first meeting event;

instructions for dragging and dropping said at least a second meeting event from said before zone above said horizontal line to said after zone below said horizontal line when changing said at least a second meeting event from before said first meeting event to after said first meeting event while maintaining said graphical interconnection by said relationship line; and instructions for dragging and dropping said at least a second meeting event from said after zone below said horizontal line to said before zone above said horizontal line when changing said at least a second meeting event from after said first meeting event to before said first meeting event while maintaining said graphical interconnection by said relationship line.

4. The system of claim 3, further comprising instructions for automatically notifying all invitees of said at least a second meeting event upon said changing said at least a second meeting event upon a user change to said first meeting event.

5. A computer program product for creating a relationship between events in an electronic calendaring application, the computer program product comprising a computer readable storage medium having computer readable program code embodied therewith, the computer readable program code comprising:

computer readable program code configured to display a plurality of days on the electronic calendaring application;

computer readable program code configured to schedule a first meeting event on a first day on the electronic calendaring application;

computer readable program code configured to schedule at least a second meeting event, related to said first meeting event, at a user designated interval from said first meeting event, said at least a second meeting event being on a second day different from said first day;

computer readable program code configured to graphically interconnect said first meeting event to said at least a second meeting event by a relationship line;

computer readable program code configured to change said at least a second meeting event upon a user change to said first meeting event, wherein said user designated time interval and said graphical interconnection by said relationship line are maintained between said first meeting event and said at least a second meeting event;

computer readable program code configured to produce a graphically interconnected tree view from the electronic calendaring application with said first meeting event as a tree base and said at least a second meeting event as at least a first branch graphically interconnected by said relationship line to said tree base, wherein said graphically interconnected tree view comprises a before zone and an after zone separated by a horizontal line in order to visually cue a user as to whether said at least a second meeting event is before or after said first meeting event;

computer readable program code configured to drag and drop said at least a second meeting event from said before zone above said horizontal line to said after zone below said horizontal line when changing said at least a second meeting event from before said first meeting event to after said first meeting event while maintaining said graphical interconnection by said relationship line; and computer readable program code configured to drag and drop said at least a second meeting event from said after zone below said horizontal line to said before zone above said horizontal line when changing said at least a second meeting event from after said first meeting event to before said first meeting event while maintaining said graphical interconnection by said relationship line.

6. The computer program product of claim 5, further comprising computer readable program code configured to automatically notify all invitees of said at least a second meeting event upon said changing said at least a second meeting event upon a user change to said first meeting event.

* * * * *